United States Patent
Yamamoto et al.

(10) Patent No.: US 10,057,459 B2
(45) Date of Patent: Aug. 21, 2018

(54) IMAGE FORMING APPARATUS, UPDATING METHOD OF GAMMA CORRECTION INFORMATION, AND STORAGE MEDIUM

(71) Applicant: CANON KABUSHIKI KAISHA, Tokyo (JP)

(72) Inventors: Yusuke Yamamoto, Tokyo (JP); Hisashi Ishikawa, Urayasu (JP); Hikaru Uchidate, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 31 days.

(21) Appl. No.: 15/291,245

(22) Filed: Oct. 12, 2016

(65) Prior Publication Data

US 2017/0111548 A1    Apr. 20, 2017

(30) Foreign Application Priority Data

Oct. 19, 2015    (JP) .................................. 2015-205516

(51) Int. Cl.
| | | |
|---|---|---|
| H04N 1/60 | (2006.01) | |
| H04N 1/40 | (2006.01) | |
| H04N 1/407 | (2006.01) | |
| H04N 1/405 | (2006.01) | |

(52) U.S. Cl.
CPC ......... *H04N 1/4078* (2013.01); *H04N 1/6036* (2013.01); *H04N 1/6091* (2013.01); *H04N 1/4056* (2013.01); *H04N 1/6008* (2013.01)

(58) Field of Classification Search
None
See application file for complete search history.

(56) References Cited

U.S. PATENT DOCUMENTS

| | | | | |
|---|---|---|---|---|
| 5,859,933 A * | 1/1999 | Sasanuma | .......... | G03G 15/5062 382/274 |
| 6,418,281 B1 * | 7/2002 | Ohki | .................. | G03G 15/5062 358/300 |
| 6,975,418 B1 * | 12/2005 | Ohta | .................. | H04N 1/00002 358/1.15 |
| 7,138,213 B2 * | 11/2006 | Itakura | ................. | G03G 9/0821 430/45.51 |
| 7,385,737 B2 * | 6/2008 | Zaima | ................ | H04N 1/40025 358/504 |
| 9,462,091 B2 | 10/2016 | Hara et al. | | |

(Continued)

FOREIGN PATENT DOCUMENTS

JP    2008-085564 A    4/2008

*Primary Examiner* — Madelein T Nguyen
(74) *Attorney, Agent, or Firm* — Carter, DeLuca, Farrell & Schmidt, LLP

(57) ABSTRACT

An image forming apparatus is provided, which is capable of implementing updating of gamma correction information with a high accuracy while avoiding a wasteful output of a patch image even in the case where environmental fluctuations occur. The image forming apparatus corrects a density tone level of image data by using gamma correction information, forms an image based on the corrected image data, and includes an updating unit configured to update the gamma correction information by using a patch image, and the updating unit updates the gamma correction information by using a patch image the output stability of which is high as first updating and further updates the gamma correction information updated by the first updating by using a patch image the sensitivity of which is high as second updating.

9 Claims, 8 Drawing Sheets

(56) References Cited

U.S. PATENT DOCUMENTS

| | | | |
|---|---|---|---|
| 9,485,388 B2 | 11/2016 | Kodama et al. | |
| 9,836,676 B2 * | 12/2017 | Hashizume | G06K 15/1878 |
| 9,912,835 B2 * | 3/2018 | Hano | H04N 1/4078 |
| 2002/0113984 A1 * | 8/2002 | Nakajima | H04N 1/4078 358/1.9 |
| 2005/0190386 A1 * | 9/2005 | Zaima | H04N 1/4078 358/1.9 |
| 2005/0206928 A1 * | 9/2005 | Itagaki | H04N 1/40006 358/1.9 |
| 2005/0260004 A1 * | 11/2005 | Maebashi | G03G 15/5062 399/15 |
| 2006/0198648 A1 * | 9/2006 | Itagaki | G03G 15/5033 399/49 |
| 2007/0019975 A1 * | 1/2007 | Komiya | G03G 15/5041 399/49 |
| 2010/0079814 A1 * | 4/2010 | Komiya | H04N 1/6033 358/3.06 |
| 2010/0309525 A1 * | 12/2010 | Tanaka | H04N 1/00002 358/3.21 |
| 2011/0317221 A1 * | 12/2011 | Yasuoka | G03G 15/011 358/3.06 |
| 2013/0002791 A1 * | 1/2013 | Yamada | G03G 15/043 347/224 |
| 2013/0302049 A1 * | 11/2013 | Nakagawa | G03G 15/5062 399/49 |
| 2014/0139883 A1 * | 5/2014 | Hashizume | G06K 15/1878 358/3.06 |
| 2014/0355010 A1 | 12/2014 | Hara et al. | |
| 2014/0376056 A1 | 12/2014 | Fujimoto et al. | |
| 2016/0004942 A1 | 1/2016 | Sumi et al. | |
| 2017/0041502 A1 | 2/2017 | Fuse et al. | |
| 2017/0111547 A1 | 4/2017 | Otani et al. | |

* cited by examiner

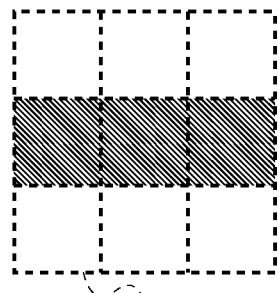 401 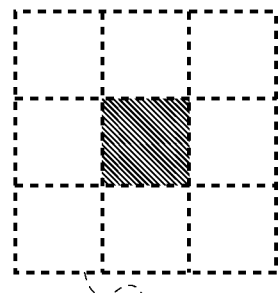 404
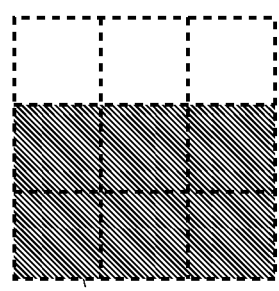 402 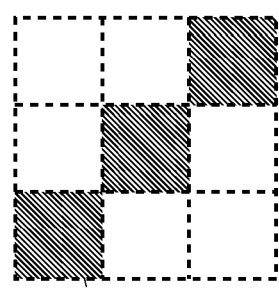 405
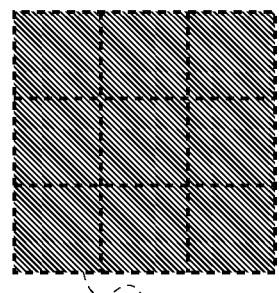 403 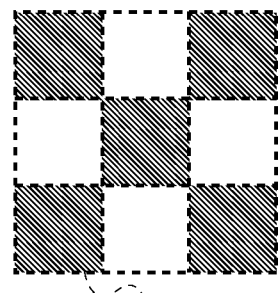 406
FIG.4

IMAGE FORMING APPARATUS, UPDATING METHOD OF GAMMA CORRECTION INFORMATION, AND STORAGE MEDIUM

BACKGROUND OF THE INVENTION

Field of the Invention

The present invention relates to updating of gamma correction information used to perform density correction for input image data in an image forming apparatus.

Description of the Related Art

Printing image data for which processing has been performed in an image processing apparatus, such as a computer, is widely performed. In general, an image processing apparatus performs density correction in accordance with gamma characteristics (input/output characteristics) for input image data and forms an image on a printing medium, such as paper, by using the image data after density correction. The density correction at this time is performed based on gamma correction information set in advance. Gamma correction information is set in advance, but the gamma characteristics change due to deterioration with the passage of time of a photoconductor drum, a transfer belt, etc., or exchange of parts. The gamma characteristics also change due to environmental fluctuations in temperature/humidity or the like. In the case where the gamma characteristics have changed, a prospected density cannot be reproduced unless the gamma correction information is updated in accordance with the change and there is a possibility that image quality deteriorates.

As a method of updating gamma correction information, for example, there is a method of updating gamma correction information based on density detection results by outputting a plurality of patch images corresponding to a plurality of tone level values onto a transfer belt or paper and by detecting densities of output patch images with a sensor or the like.

However, in the case where large environmental fluctuations have occurred from the normal state, it is no longer possible for an image processing apparatus to stably output a patch image and it is frequent that the output density of a patch image is higher than the density supposed from the amount of environmental fluctuations. For example, there is a case where the same density is detected from patch images at a plurality of tone levels. There is a case where the gamma correction information updated based on the density detection results such as those may cause a tone jump in which the gamma characteristics change rapidly.

In order to solve this problem, Japanese Patent Laid-Open No. 2008-085564 has proposed a method of selecting one of the highest density and the lowest density in each area in the case where the same density is detected in a plurality of patch images in the area in which density is low and a plurality of patch images in the area in which density is high. Due to the method such as this, the gamma correction information is updated so as to reduce the occurrence of tone jump.

However, in the method described in Japanese Patent Laid-Open No. 2008-085564, a plurality of patch images is output in the area in which density is low and in the area in which density is high, but in the case where patch images having the same density exist, the number of pieces of density information effective for setting a gamma correction curve is reduced. That is, a wasteful patch image is output in order to acquire density information necessary for setting a gamma correction curve, and therefore, there is such a problem that toner is consumed wastefully. On the other hand, in the method described in Japanese Patent Laid-Open No. 2008-085564, in the case where the number of patch images is reduced in order to avoid a wasteful output of a patch image, there is a possibility that it is no longer possible to correct density with a high accuracy in the area in which density is low and the area in which density is high.

SUMMARY OF THE INVENTION

The image forming apparatus according to the present invention is an image forming apparatus that corrects a density tone level of image data by using gamma correction information and forms an image based on the corrected image data, and has an updating unit configured to update the gamma correction information by using a patch image, and the updating unit updates the gamma correction information by using a patch image the output stability of which is high as first updating, and further updates the gamma correction information updated by the first updating by using a patch image the sensitivity of which is high as second updating.

Further features of the present invention will become apparent from the following description of exemplary embodiments (with reference to the attached drawings).

BRIEF DESCRIPTION OF THE DRAWINGS

FIG. 4 is a schematic diagram showing the way output dots of a patch image are arranged;

DESCRIPTION OF THE EMBODIMENTS

In the following, with reference to the attached drawings, the present invention is explained in detail based on preferred embodiments. The configurations shown in the following embodiments are merely exemplary and the present invention is not limited to the configurations shown schematically.

[First Embodiment]

Figure 1:
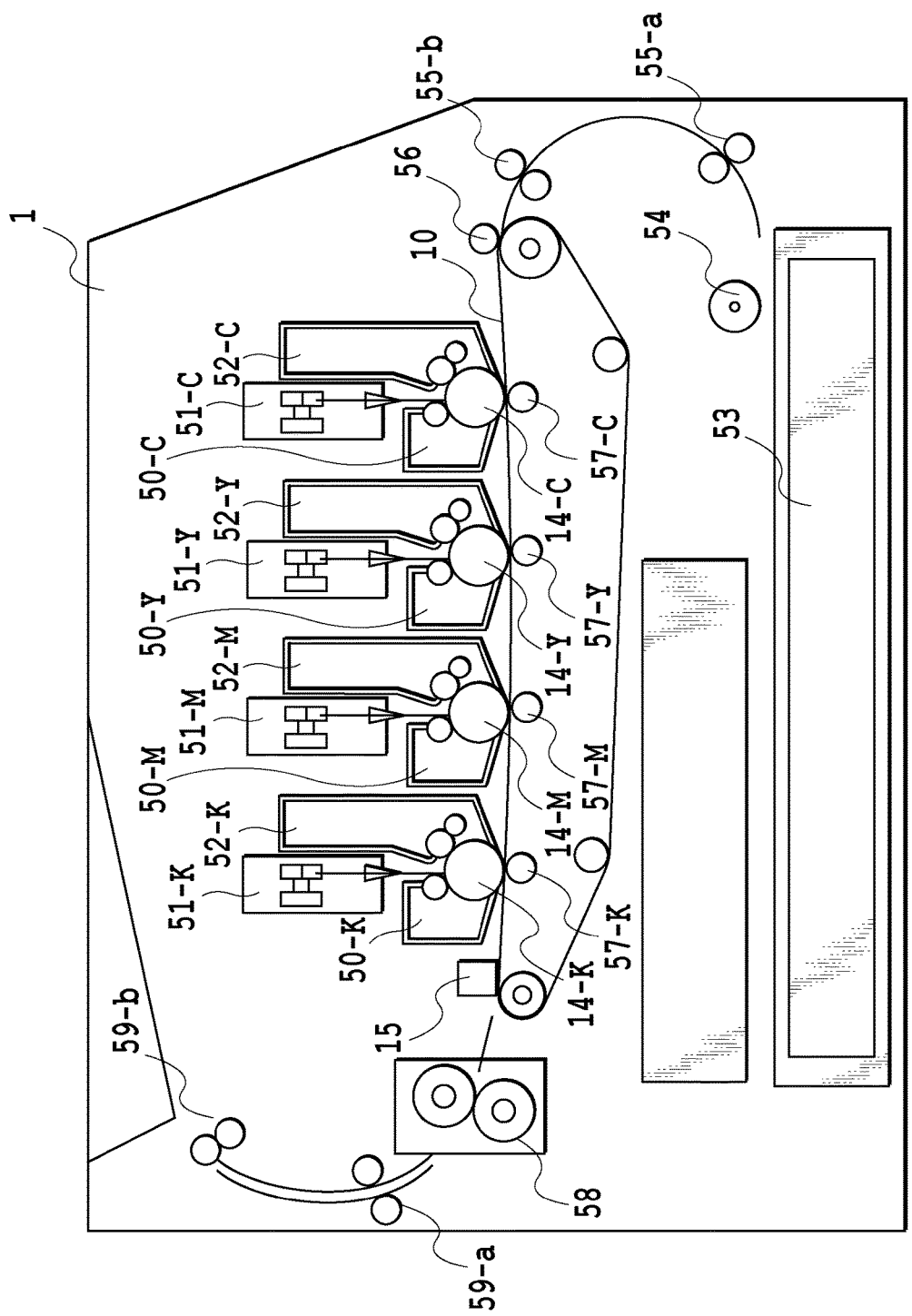
FIG. 1 is a sectional view showing an internal structure of an image forming apparatus in a first embodiment.

FIG. 1 is a sectional view showing an internal structure of an image forming apparatus in the present embodiment.

An image forming apparatus 1 has a structure of a four-drum color laser beam printer. As shown in FIG. 1, to the bottom of the image forming apparatus 1, a transfer material cassette 53 is attached. Printing media (printing paper, transmission sheets, etc.) set in the transfer material cassette 53 are taken out one by one by a paper feed roller 54 and sent to an image forming unit by a pair of conveyance rollers 55-*a* and 55-*b*. A transfer conveyance belt 10 that conveys a printing medium to the image forming unit is installed in the stretched state so as to be flat in a printing medium conveyance direction (from right to left in FIG. 1) by a plurality of rotation rollers and at the most upstream side of the transfer conveyance belt 10, the printing medium is electrostatically adsorbed to the conveyance belt 10. Further, in opposition to the belt conveyance surface, four photoconductor drums 14-C, 14-M, 14-Y, and 14-K as four image carriers in the shape of a drum are arranged linearly and configure the image forming unit. Here, C, Y, M, and K denote color components, i.e., cyan, yellow, magenta, and black, respectively. The image forming unit for each color component has the same structure except only in that the color of mounted toner is different, and therefore, in the following, explanation is given by taking the image forming unit for C color as an example.

The image forming unit for C color has an electrifier 50-C that uniformly electrifies the surface of the photoconductor drum 14-C, a development counter 52-C that develops an electrostatic latent image formed on the photoconductor drum 14-C, and an exposure unit 51-C. A predetermined interval is provided between the development counter 52-C and the electrifier 50-C. The exposure unit 51-C scans and exposes the photoconductor drum 14-C the surface of which is uniformly electrified by the electrifier 50-C with laser light from the exposure unit 51-C including a laser scanner via the above-described interval. By scanning and exposing, the scanned and exposed portion enters an electrified state different from that of an unexposed portion and an electrostatic latent image is generated. The development counter 52-C develops the above-described electrostatic latent image by transferring toner thereto.

Further, a transfer unit 57-C is arranged with a conveyance surface of the transfer conveyance belt 10 sandwiched in between. The toner image formed (developed) on the circumferential surface of the photoconductor drum 14-C is charge-adsorbed onto the printing medium that is conveyed by a transfer electric field formed in the transfer unit 57-C and thereby transferred onto the printing medium surface.

By performing the above-described processing for the color component C also for the other color components Y, M, and K, the toner of each color of C, M, Y, and K is transferred sequentially onto the printing medium. After this, the toner of each color on the printing medium is thermally fused and fixed, and then the printing medium is discharged to the outside of the apparatus by a pair of paper discharge rollers 59-a and 59-b.

The example in which the toner image of each color component is directly transferred onto the printing medium is shown as above, but the image forming apparatus that can be applied to the present invention is not limited to the configuration such as this. For example, a configuration may be accepted in which the toner image of each color component is once transferred onto the transfer conveyance belt and then, the toner image generated on the transfer conveyance belt is transferred again (secondarily transferred) onto the printing medium. The transfer belt in the case where the secondary transfer such as this is performed is called an intermediate transfer belt.

Figure 2:
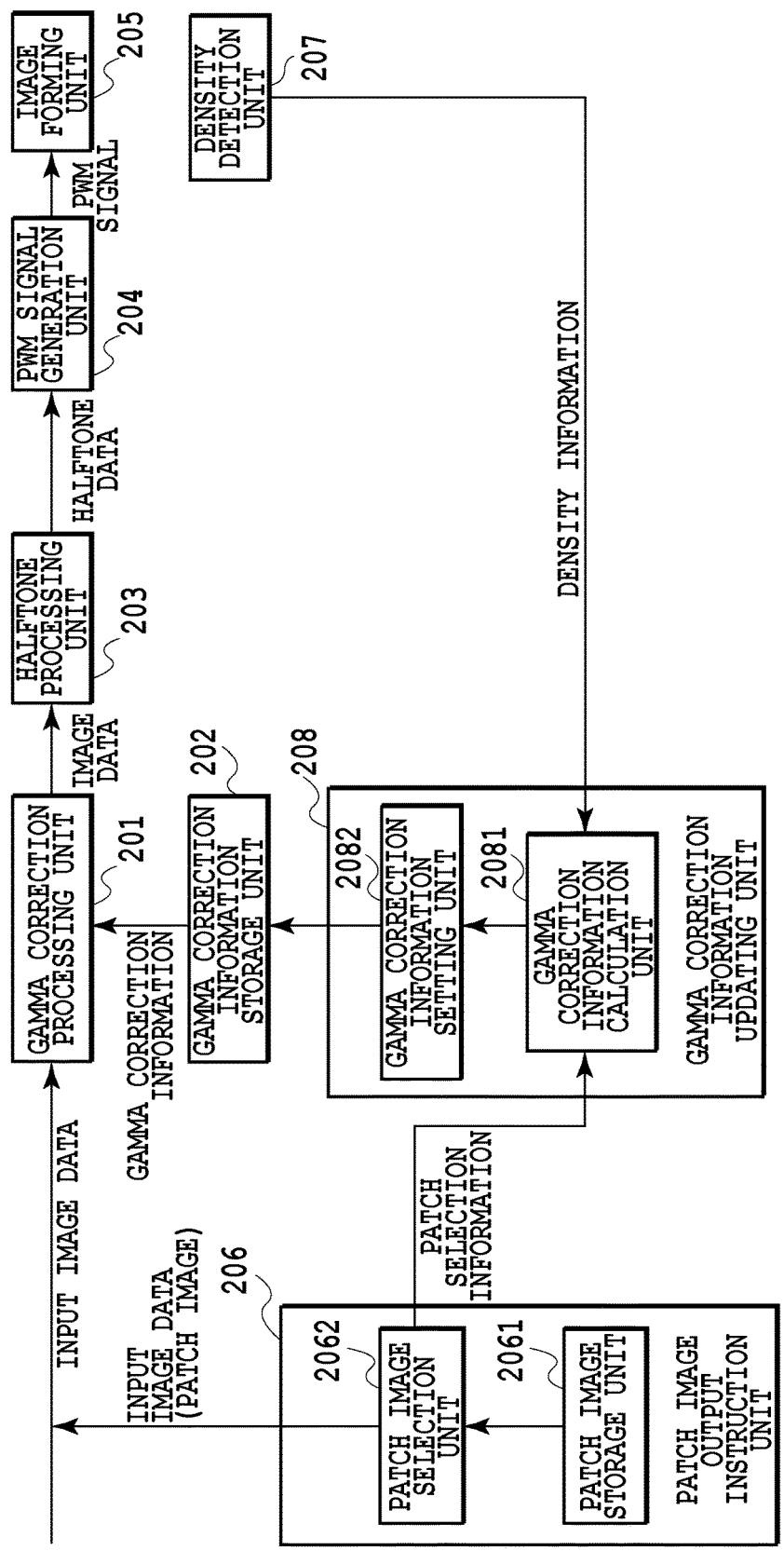
FIG. 2 is a block diagram showing a logic configuration of the image forming apparatus in the first embodiment.

FIG. 2 is a block diagram showing a logic configuration of the image forming apparatus of the present embodiment.

A gamma correction processing unit 201 performs gamma correction (density correction) processing for image data that is input (input image data) by using gamma correction information stored in a gamma correction information storage unit 202. Here, the input image data is multivalued image data (CMYK data) converted into each color space of CMYK and the gamma correction processing unit 201 corrects the density tone level of each color to a target tone level. Although not shown in FIG. 2, in the case where the input image data is not CMYK data, processing to convert the input image data into CMYK data is performed before the gamma correction.

The gamma correction information storage unit 202 stores gamma correction information in a lookup table (LUT). In the present embodiment, gamma correction information is stored as an LUT, but this is not limited and gamma correction information may be stored in another form.

A halftone processing unit 203 performs halftone processing for the image data after gamma correction (density correction) and converts the image data into halftone data with a smaller number of tone levels.

A pulse width modulation (PWM) signal generation unit 204 generates a publicly known PWM signal and outputs the PWM signal to an image forming unit 205.

The image forming unit 205 forms an image in accordance with the PWM signal. Specifically, by the exposure unit 51-C and exposure units 51-M, 51-Y, and 51-K in FIG. 1, the photoconductor drums 14-C, 14-M, 14-Y, and 14-K are scanned and exposed. The amount of exposure at the time of scan and exposure is controlled in accordance with the PWM signal. Then, by the development counter 52-C and development counters 52-M, 52-Y, and 52-K, the image is developed.

A patch image output instruction unit 206 includes a patch image storage unit 2061 and a patch image selection unit 2062. The patch image selection unit 2062 selects a patch image to be output for updating gamma correction information from among patch images stored in the patch image storage unit 2061. The data of the selected patch image is input to the gamma correction processing unit 201 as input image data and instructions to output the patch image are given. In accordance with the instructions of the patch image output instruction unit 206, the processing of the gamma correction processing unit 201, the halftone processing unit 203, and the PWM signal generation unit 204 is performed and the patch image is formed by the image forming unit 205.

A density detection unit 207 detects density information on the formed patch image. For the density detection performed by the density detection unit 207, a publicly known method may be used.

A gamma correction information updating unit 208 includes a gamma correction information calculation unit 2081 and a gamma correction information setting unit 2082 and updates gamma correction information stored in the gamma correction information storage unit 202. The gamma correction information calculation unit 2081 calculates gamma correction information based on the density information on the patch image detected by the density detection unit 207. The gamma correction information setting unit 2082 sets the gamma correction information on the image forming apparatus to the gamma correction information calculated by the gamma correction information calculation unit 2081.

Figure 3:
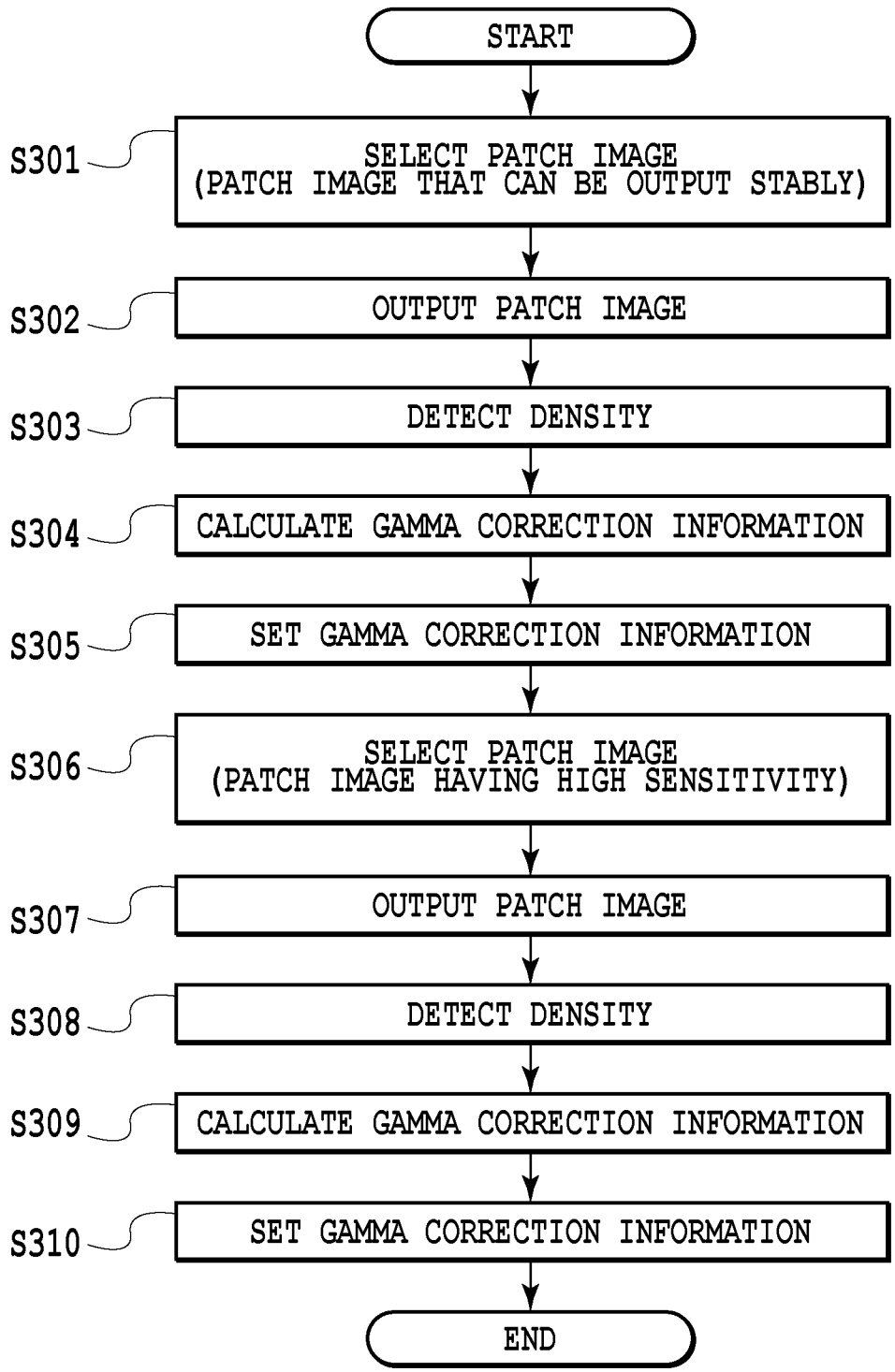
FIG. 3 is a diagram showing a processing flow to update gamma correction information in the first embodiment.

FIG. 3 is a diagram showing a processing flow to update gamma correction information in the present embodiment.

At step S301, the patch image selection unit 2062 selects a patch image that can be output stably even in the case where environmental fluctuations within the casing of the image forming apparatus occur (patch image the output stability of which is high against environmental fluctuations) from among the patch images stored in the patch image storage unit 2061. Among the patch images stored in the patch image storage unit 2061, which patch image is a patch image the output stability of which is high and which patch image is a patch image the sensibility of which is high for environmental fluctuations are set in advance for each patch image. The information such as this is set in advance based on the way output dots of a patch image are arranged (hereinafter, dot arrangement) and is stored in the patch image storage unit 2061 in association with the patch image.

In the case where dots are formed in a color laser beam printer, the distribution of potential on the photoconductor due to exposure is not an ideal distribution in the shape of a rectangle, but is, for example, a Gaussian distribution. Because of this, there is a case where toner cannot be attached stably because the potential on the photoconductor cannot decrease sufficiently depending of the dot arrangement. In the present embodiment, whether or not a patch image is one the output stability of which is high against environmental fluctuations (output stability of patch image) and whether or not a patch image is one the sensitivity of which is high for environmental fluctuations (sensitivity of patch image) are determined based on the dot arrangement of the patch image.

FIG. 4 is a schematic diagram showing output dot arrangement of a patch image in the present embodiment. For simplicity, a pattern of 3×3 dots is explained. The patch image in the present embodiment is configured by repeating the pattern such as this and the size of the pattern that is repeated is not limited to 3×3 dots.

A patch image in which a plurality of dots, such as patterns 401, 402, and 403, is connected densely in the horizontal direction and in the vertical direction is determined to be a patch image that can be output stably even in the case where environmental fluctuations occur (patch image the output stability of which is high against environmental fluctuations). For the patterns 401, 402, and 403 in which a plurality of dots is connected densely in the horizontal direction and in the vertical direction, the exposure spots are connected continuously at the time of image formation, and therefore, the potential at a black pixel position decreases sufficiently, and toner is attached stably. Because of this, even in the case where large environmental fluctuations occur, dots are output stably. That is, even in the case where the gamma characteristics considerably change due to large environmental fluctuations, it is possible to calculate gamma correction information correctly indicating the tendency of density fluctuations due to environmental fluctuations based on the output density of the patch image such as this.

On the other hand, for a patch image in which dots are sparse in the horizontal direction and in the vertical direction, such as patterns 404, 405, and 406, there is a case where dots are not output stably in the case where the gamma characteristics change considerably due to large environmental fluctuations. A patch image configured by repeating these patterns is determined to be a patch image the sensitivity of which is high for environmental fluctuations. There is a case where the potential at a black pixel position does not decrease sufficiently and toner is not attached stably at the time of image formation for the patterns 404 and 405 due to the occurrence of large environmental fluctuations. Further, for the pattern 406, there is a case where a white pixel disappears because the potential at a white pixel position decreases due to the influence of exposure at a black pixel position therearound at the time of image formation.

It is possible to set output stability information and sensitivity information on a patch image based on calculation results. For example, the ratio between the number of sides (outer sides) in contact with a white pixel among sides around a dot and the area of the dots has a correlation with the output stability and the sensitivity. In the example of the pattern 405, for the dot area 3, the number of outer sides is 12, and therefore, the above-described ratio is 1/4. Further, in the example of the pattern 402, for the dot area 6, the number of outer sides is 10, and therefore, the above-described ratio is 3/5. There is a tendency that the larger the above-described ratio, the higher the output stability is, and in the case where the above-described ratio is larger than or equal to a first ratio threshold value, information indicating that output stability is high is set to the output stability information. There is a tendency that the smaller the above-described ratio, the higher the sensitivity is, and therefore, in the case where the above-described ratio is smaller than or equal to a second ratio threshold value, information indicating that sensitivity is high is set to the sensitivity information. Here, the second ratio threshold value is a value equal to the first ratio threshold value or a value smaller than the first ratio threshold value.

It is also possible to set the output stability information and the sensitivity information on a patch image based on experimental results. For example, there is a method of experimentally checking in which degree density fluctuations occur by outputting and measuring a plurality of patch images prepared in advance under various development conditions and exposure conditions, and at various temperatures and humidity. Then, in the case where the degree of density fluctuations is smaller than or equal to a first density fluctuation threshold value, information indicating that output stability is high is set to the output stability information. In the case where the degree of density fluctuations is larger than or equal to a second density fluctuation threshold value, information indicating that sensitivity is high is set to the sensitivity information. Here, the second density fluctuation threshold value is a value equal to the first density fluctuation threshold value or a value larger than the first density fluctuation threshold value.

As described above, at step S301, the patch image selection unit 2062 selects a patch image that can be output stably even in the case where environmental fluctuations occur, such as a patch image configured by repeating the patterns 401, 402, and 403.

At step S302, the patch image output instruction unit 206 gives instructions to output the patch image selected at step S301. In response to the instructions of the patch image output instruction unit 206, the processing of the gamma correction processing unit 201, the halftone processing unit 203, and the PWM signal generation unit 204 is performed and the patch image is formed by the image forming unit 205.

At step S303, the density detection unit 207 detects the density information on the patch image formed at step S302. As a method of detecting density, for example, there is a method of calculating the density of the patch image from a detected reflection density by detecting the reflecting density of the toner formed on the transfer belt with a sensor, such as a CCD element. The method of detecting density is not limited to this and another method may be used.

At step S304, the gamma correction information calculation unit 2081 calculates gamma correction information from the density information on the patch image detected at step S303. The gamma correction information calculation unit 2081 stores density corresponding to an equally divided grid point obtained by equally dividing the entire range of values that the input image data can take in the LUT as gamma correction information. In order to implement accurate gamma characteristics, density information corresponding to a sufficient number of grid points is necessary. For a grid point for which density information is not acquired, the gamma correction information calculation unit 2081 calculates gamma correction information by performing interpolation processing, for example, linear interpolation, by using density information on nearby grid points for which density information has been acquired.

The density detected at step S303 is the density of a patch image that can be output stably even in the case where environmental fluctuations occur. Because of this, at step S304, it is possible for the gamma correction information calculation unit 2081 to calculate gamma correction information correctly indicating the tendency of density fluctuations due to environmental fluctuations.

At step S305, the gamma correction information setting unit 2082 updates the gamma correction information on the image forming apparatus to the gamma correction information calculated at step S304.

At step S306, the patch image selection unit 2062 selects a patch image for gamma correction information updating with a high accuracy. The patch image selected at this step is a patch image the output density of which fluctuates considerably due to environmental fluctuations, i.e., a patch image the sensitivity of which is high for environmental fluctuations.

At step S307, the patch image output instruction unit 206 gives instructions to output the patch image selected at step S306. In response to the instructions of the patch image output instruction unit 206, the processing of the gamma correction processing unit 201, the halftone processing unit 203, and the PWM signal generation unit 204 is performed, and thereby, the patch image is formed by the image forming unit 205. At this step, the gamma correction information updated at step S305 is used, and therefore, it is possible for the image forming unit 205 to stably output even a patch image the sensitivity of which is high for environmental fluctuations.

At step S308, the density detection unit 207 detects density information on the patch image formed at step S307.

At step S309, the gamma correction information calculation unit 2081 calculates gamma correction information from the density information on the patch image detected at step S308. As described previously, at step S304, the gamma correction information on a grid point for which gamma correction information is not acquired is calculated by performing interpolation processing. In the case where the density information calculated by the interpolation processing differs from the density information acquired at step S308, the gamma correction information calculation unit 2081 performs the interpolation processing again by using the density information acquired at step S308.

At step S310, the gamma correction information setting unit 2082 sets the gamma correction information on the image forming apparatus to the gamma correction information calculated at step S309.

As described above, at steps S301 to S305, first gamma correction information updating that regards output stability as important is performed based on the density information on the patch image that can be output stably even in the case where environmental fluctuations occur. At steps S306 to S310, second gamma correction information updating with a high accuracy is performed based on the density information on the patch image the sensitivity of which is high for environmental fluctuations. The image formation at step S307 is image formation after the first gamma correction information updating is performed, and therefore, in the image formation at step S307, it is possible to stably output even a patch image the sensitivity of which is high. Consequently, it is possible to avoid a wasteful output of a patch image. Further, in the calculation of gamma correction information at step S309, the density information on the patch image the sensitivity of which is high for environmental fluctuations is used, and therefore, the calculated gamma correction information is gamma correction information with a high accuracy. Because of this, it is possible to perform gamma correction information updating with a high accuracy.

According to the present embodiment, it is possible to implement updating with a high accuracy of gamma correction information while avoiding a wasteful output of a patch image even in the case where environmental fluctuations occur.

At steps S306 to S310 of the present embodiment, gamma correction information is updated by selecting a patch image the sensitivity of which is high for environmental fluctuations, but it may also be possible to update gamma correction information by selecting a patch image the density of which is close to that of a grid point of the LUT. Alternatively, it may also be possible to update gamma correction information by selecting a patch image the sensitivity of which is high for environmental fluctuations and a patch image the density of which is close to that of a grid point of the LUT.

[Second Embodiment]

In the first embodiment, based on the output stability set in advance for each patch image, a patch image that can be output stably even in the case where environmental fluctuations occur is selected uniquely. However, there is a case where a patch image that can be output stably even in the case where environmental fluctuations occur changes depending on the amount of environmental fluctuations or the contents having fluctuated. On the other hand, there is also a case where all the patch images can be output stably depending on the amount of environmental fluctuations or the contents having fluctuated. In the present embodiment, whether or not there is a patch image that cannot be output stably depending on the amount of environmental fluctuations or the contents having fluctuated is determined.

Figure 5:
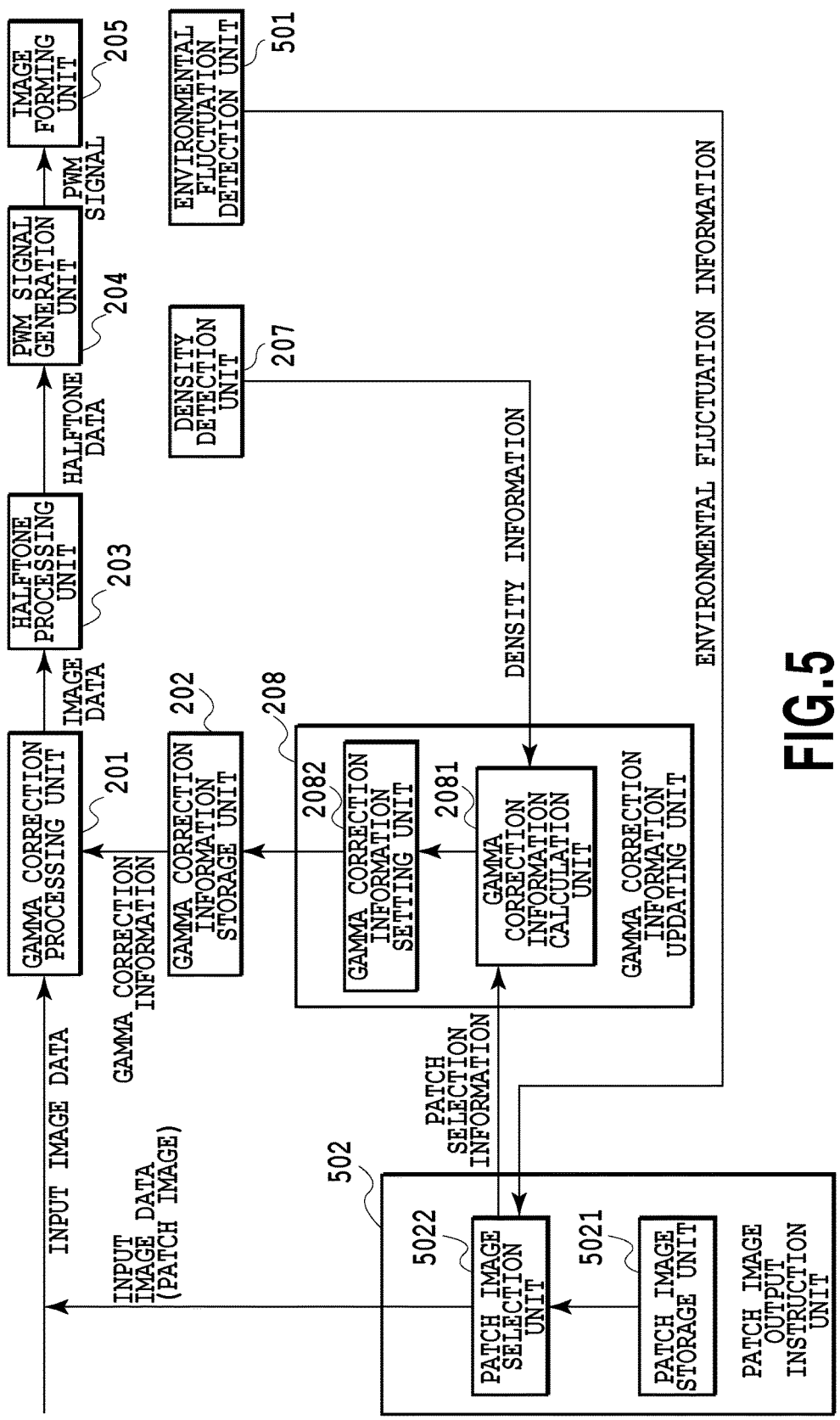
FIG. 5 is a block diagram showing a logic configuration of an image forming apparatus in a second embodiment.

FIG. 5 is a block diagram showing a logic configuration of an image forming apparatus of the present embodiment. The gamma correction processing unit 201, the gamma correction information storage unit 202, the halftone processing unit 203, the PWM signal generation unit 204, the image forming unit 205, the density detection unit 207, the gamma correction information calculation unit 2081, and the gamma correction information setting unit 2082 are the same as those of the first embodiment. Consequently, explanation of these components is omitted. In the following, components different from those of the first embodiment are explained.

An environmental fluctuation detection unit 501 detects environmental information, such as temperature and humidity, at the present time and acquires environmental fluctuation information by comparing the environmental information with that at the time of the previous gamma correction information updating.

A patch image output instruction unit 502 includes a patch image storage unit 5021 and a patch image selection unit 5022. The patch image selection unit 5022 determines whether or not there is a patch image that cannot be output stably in accordance with the environmental fluctuation information detected by the environmental fluctuation detection unit 501. In which case of environmental fluctuations a patch image can be output stably is set in advance for each patch image. Such information is stored in the patch image storage unit 5021 in association with the patch image and is used for stability determination by the patch image selection unit 5022. For example, the patch image such as the pattern 405 in FIG. 4 is determined that stable output is not possible in the case where the amount of environmental fluctuations is larger than a fluctuation amount threshold value and that stable output is possible in the case where the amount of environmental fluctuations is smaller than or equal to the fluctuation amount threshold value.

Figure 6:
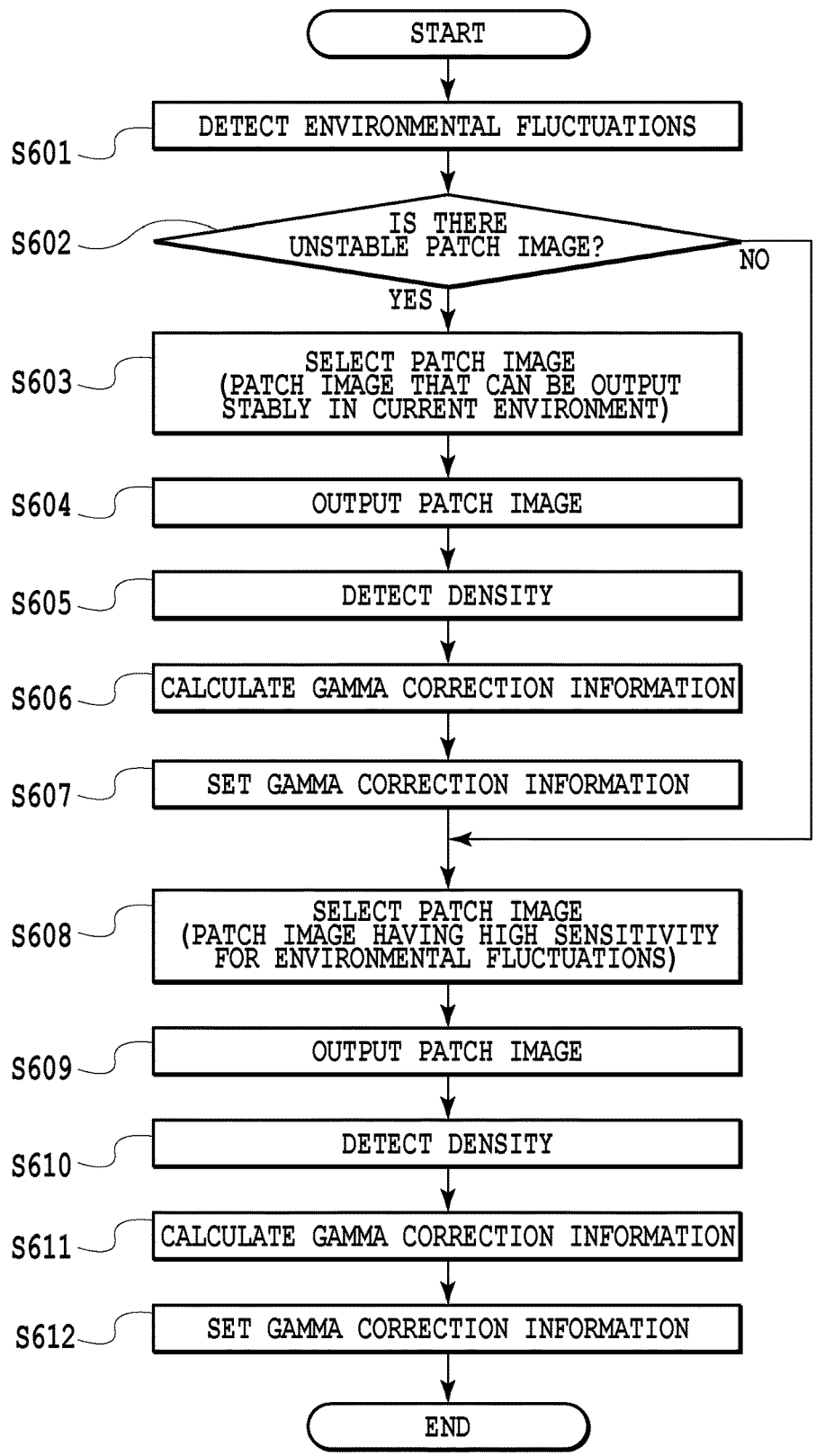
FIG. 6 is a diagram showing a processing flow to update gamma correction information in the second embodiment.

FIG. 6 is diagram showing a processing flow to update gamma correction information in the present embodiment.

At step S601, the environmental fluctuation detection unit 501 detects environmental information relating to density fluctuations and acquires environmental fluctuation information by comparing the environmental information with the environmental information at the time of the previous gamma correction information updating. For example, the temperature and humidity within the casing of the image forming apparatus are detected with a temperature/humidity sensor or the like. It may also be possible for the environmental fluctuation detection unit 501 to detect information, such as the fixing temperature of the fixing unit and the bias of the photoconductor drum, by using various sensors. Further, the environmental information to be detected may be another piece of information as long as the information affects the output stability of a patch image.

At step S602, the patch image selection unit 5022 determines whether there is a patch image that cannot be output stably among the patch images stored in the patch image storage unit 5021 in accordance with the environmental fluctuation information detected at step S601. In the case where there is a patch image that cannot be output stably, the processing proceeds to step S603 and in the case where there is no patch image that cannot be output stably, the processing proceeds to step S608.

At step S603, the patch image selection unit 5022 selects a patch image that can be output stably in accordance with the detected environmental fluctuation information.

The processing at steps S604 to S612 is the same as the processing at steps S302 to S310 in FIG. 3, and therefore, explanation is omitted.

As described above, in the present embodiment, whether there is a patch image that cannot be output stably in accordance with the amount of environmental fluctuations or the contents having fluctuated. In the case where there is a patch image that cannot be output stably, first the first gamma correction information updating that regards output stability as important is performed based on the density information on the patch image that can be output stably. Then, the second gamma correction information updating with a high accuracy is performed based on the density information on the patch image the sensitivity of which is high for environmental fluctuations. In the case where there is no patch image that cannot be output stably, the first gamma correction information updating that regards output stability as important is not performed and only the second gamma correction information updating with a high accuracy is performed based on the density information on the patch image the sensitivity of which is high for environmental fluctuations.

According to the present embodiment, it is made possible to select a patch image in accordance with the situation of environmental fluctuations. Further, in the present embodiment, by determining the output stability of a patch image in accordance with the amount of environmental fluctuations or the contents having fluctuated, it is possible to further avoid a wasteful output of a patch image.

[Third Embodiment]

In the first embodiment, the image forming apparatus selects a patch image that can be output stably based on the output stability set in advance for each patch image. The image forming apparatus of the second embodiment determines whether or not there is a patch image that cannot be output stably in accordance with the amount of environmental fluctuations or the contents having fluctuated. Normally, it is frequent that the output density detected in the case where a patch image that cannot be output stably is output differs considerably from the density supposed from the amount of environmental fluctuations. The reason is that, in many cases, whether or not toner is attached largely affects the output density rather than small fluctuations in the amount of attached toner. Because of this, it is possible to determine the output stability of a patch image against environmental fluctuations from the density detection results. In the present embodiment, gamma correction information is updated by making use of the characteristics.

Figure 7:
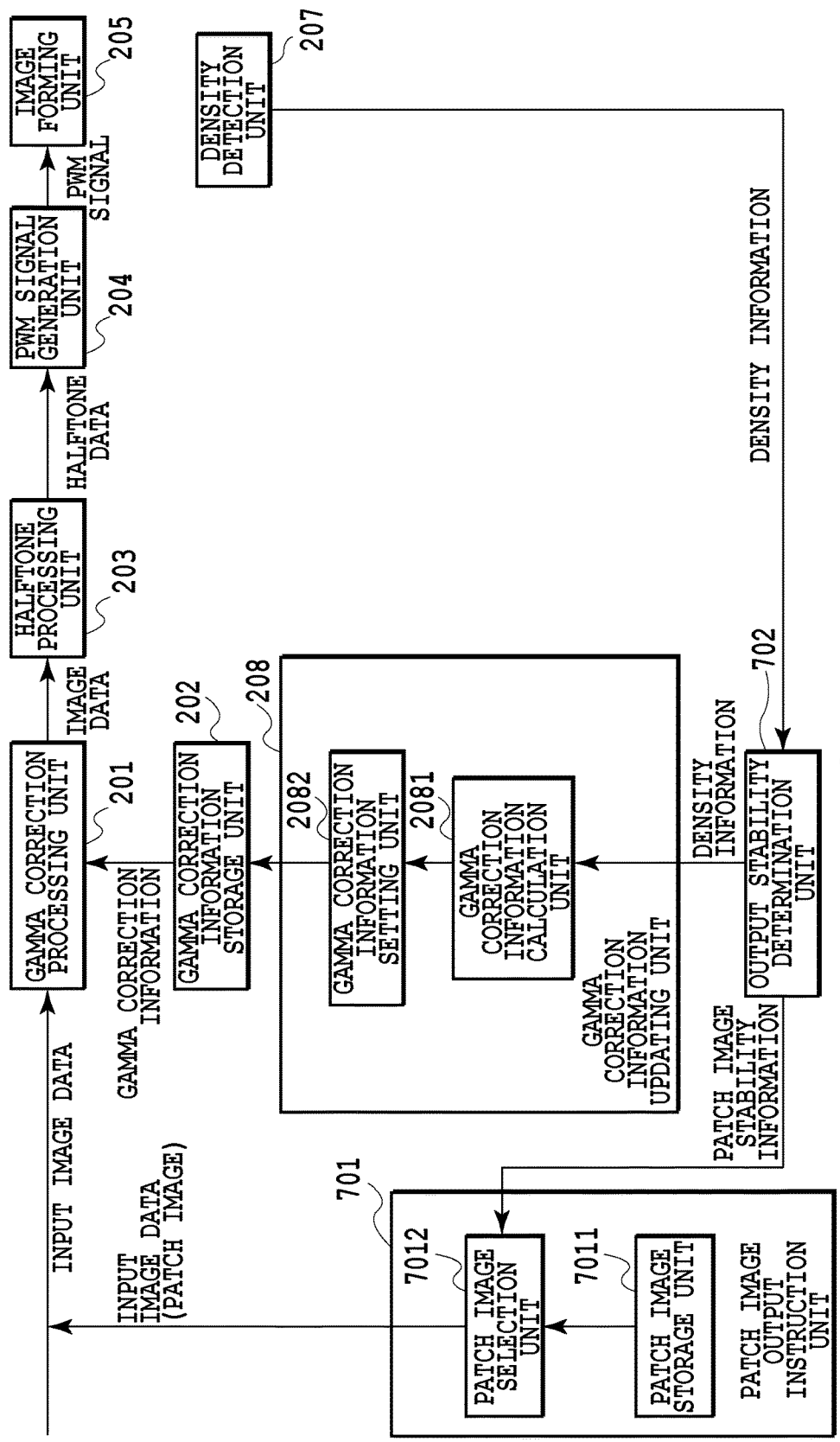
FIG. 7 is a block diagram showing a logic configuration of an image forming apparatus in a third embodiment.

FIG. 7 is a block diagram showing a logic configuration of an image forming apparatus of the present embodiment. The gamma correction processing unit 201, the gamma correction information storage unit 202, the halftone processing unit 203, the PWM signal generation unit 204, the image forming unit 205, the density detection unit 207, the gamma correction information calculation unit 2081, and the gamma correction information setting unit 2082 are the same as those of the first embodiment. Consequently, explanation of these components is omitted.

A patch image output instruction unit 701 includes a patch image storage unit 7011 and a patch image selection unit 7012. The patch image selection unit 7012 selects a patch image to be output from among patch images stored in the patch image storage unit 7011.

An output stability determination unit 702 determines the output stability of a patch image against environmental fluctuations based on the density detection results of the patch image.

In the present embodiment, first, the patch image selection unit 7012 selects all the patch images of the patch image group stored in the patch image storage unit 7011 and gives instructions to output the patch images. Based on the density detection results of the formed patch image, the output stability of the patch image is determined. The density information on the patch image the output stability of which is determined to be high is used for calculation of gamma correction information by the gamma correction information calculation unit 2081. In this manner, the first gamma correction information updating that regards output stability as important is performed. Then, after the first gamma correction information updating is performed, the patch image selection unit 7012 selects a patch image the output stability of which is determined to be low and gives instructions to output the patch image. Based on the density information on the formed patch image, the second gamma correction information updating is performed. The patch image the output stability of which is low has a high sensitivity for environmental fluctuations. Because of this, the second gamma correction information updating that uses the density information on such a patch image will be gamma correction information updating with a high accuracy.

Figure 8:
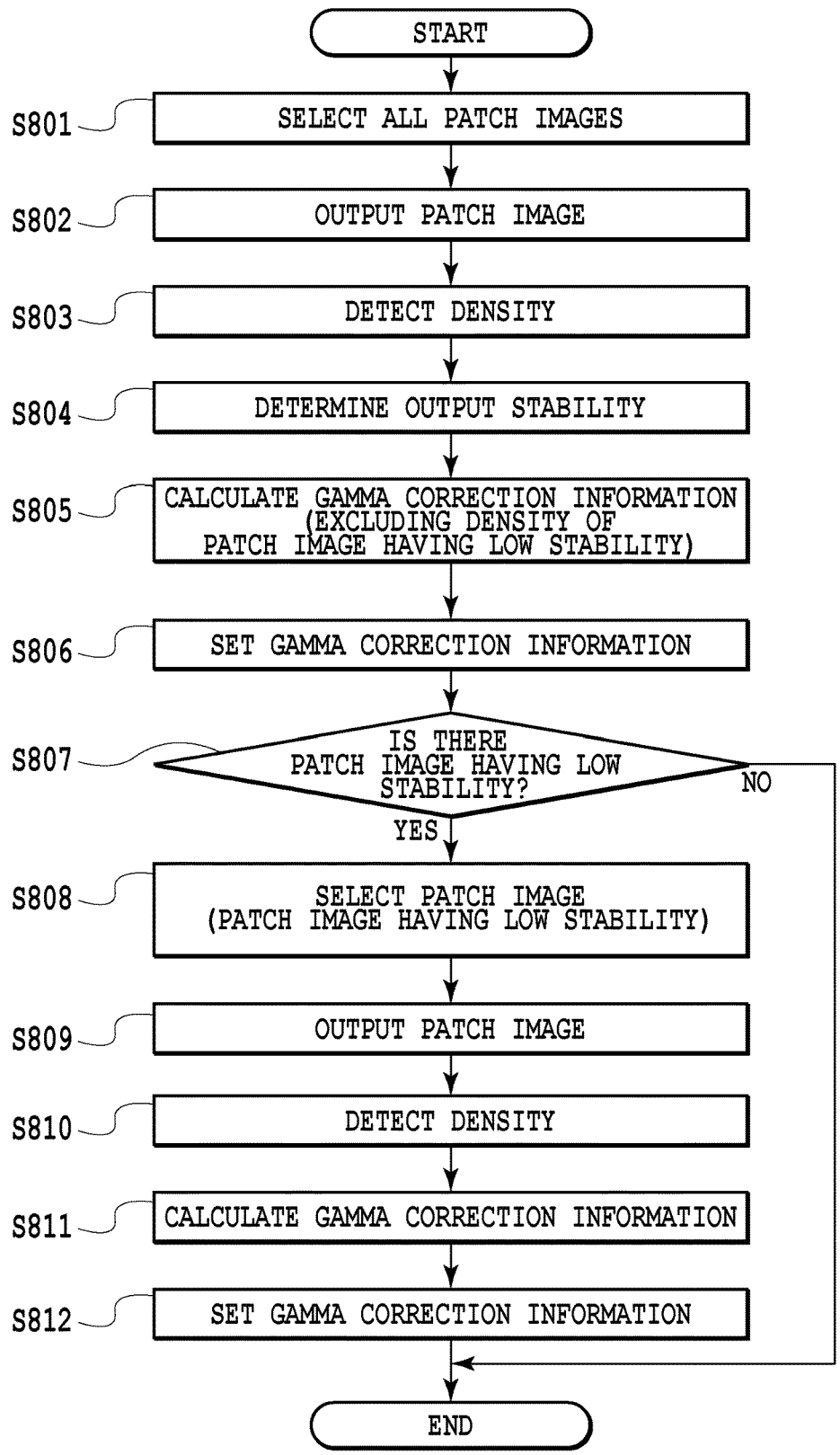
FIG. 8 is a diagram showing a processing flow to update gamma correction information in the third embodiment.

FIG. 8 is a diagram showing a processing flow to update gamma correction information in the present embodiment.

At steps S801 to S803, all the patch images are selected and output and the density information on all the output patch images is detected.

At step S804, the output stability determination unit 702 determines the output stability of the patch image against environmental fluctuations based on the detected density information. Normally, the gamma correction information fluctuates smoothly for an input tone level value. Consequently, a patch image having a density that changes rapidly for the density of surrounding patch images is determined to have not been output stably. That is, the patch image is determined to be a patch image the output stability of which is low against environmental fluctuations. Alternatively, in the case where a range (maximum value and minimum value) in which the density of a patch image fluctuates is measured in advance in a variety of environmental fluctuations and the density information on a patch image detected at step S803 is not within a supposed range (within a predetermined range), the patch image is determined to have not been output stably. That is, the patch image is determined to be a patch image the output stability of which is low against environmental fluctuations.

At step S805, the gamma correction information calculation unit 2081 calculates gamma correction information based on the density information on the patch images excluding the patch images the output stability of which is determined to be low at step S804. That is, the gamma correction information calculation unit 2081 calculates gamma correction information based on the density information on the patch images that can be output stably even in the case where environmental fluctuations occur. Further, the gamma correction information on all the grid points is calculated by interpolation processing. The gamma correction information calculated at this step is correction information calculated by using only the density information on the patch images that can be output stably, and therefore, is gamma correction information correctly indicating the tendency of density fluctuations due to environmental fluctuations.

At step S806, the gamma correction information setting unit 2082 sets the gamma correction information on the image forming apparatus to the gamma correction information calculated at step S805. The gamma correction information updating performed at step S805 and this step is the first gamma correction information updating that regards output stability as important.

At step S807, the patch image selection unit 7012 determines whether or not there is a patch image the output stability of which is determined to be low by the determination at step S804. In the case where there is a patch image the output stability of which is determined to be low, the processing proceeds to step S808 and in the case where there is not a patch image the output stability of which is low, the present processing flow is terminated.

At steps S808 to S810, the patch image the output stability of which is determined to be low by the determination at step S804 is selected and output and the density information on the output patch image is detected. The image formation at step S809 is image formation after the gamma correction information updating at steps S805 and S806 is performed, and therefore, in the image formation at step S809, even the patch image the output stability of which is determined to be low by the determination at step S804 can be output stably.

At step S811, the gamma correction information calculation unit 2081 calculates gamma correction information from the density information detected at step S810. At step S812, the gamma correction information setting unit 2082 sets the gamma correction information on the image forming apparatus to the gamma correction information calculated at step S811. The processing at steps S811 and S812 is the same as that at steps S309 and S310 in FIG. 3, and therefore, detailed explanation is omitted.

In the present embodiment, from the density detection results, the output stability of a patch image is determined. Due to this, it is made possible to select a patch image in accordance with the situation of environmental fluctuations without the need to newly add a sensor or a mechanism for detecting environmental fluctuations.

[Other Embodiments]

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

According to the present invention, it is possible to implement updating of gamma correction information with a high accuracy while avoiding a wasteful output of a patch image even in the case where environmental fluctuations occur.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-205516 filed Oct. 19, 2015, which is hereby incorporated by reference wherein in its entirety.

What is claimed is:

1. An image forming apparatus that corrects a density tone level of image data by using gamma correction information and forms an image based on corrected image data, the image forming apparatus comprising:
   one or more processors; and
   at least one memory coupled to the one or more processors, the at least one memory having instructions stored thereon which, when executed by the one or more processors, cause the image forming apparatus to:
   update the gamma correction information by using a patch image,
   wherein updating the gamma correction information by using a patch image the output stability of which is high for environmental fluctuations within a casing of the image forming apparatus as first updating and further updates the gamma correction information updated by the first updating by using a patch image the sensitivity of which is high for environmental fluctuations within a casing of the image forming apparatus as second updating after the first updating; and cause the image forming apparatus to form the image.

2. The image forming apparatus according to claim 1, wherein the patch image the output stability of which is high is a patch image the output stability of which is high against environmental fluctuations within a casing of the image forming apparatus and is also a patch image in which a plurality of dots is connected densely in the horizontal direction and in the vertical direction.

3. The image forming apparatus according to claim 1, wherein the patch image the sensitivity of which is high is a patch image the sensitivity of which is high for environmental fluctuations within a casing of the image forming apparatus and is also a patch image in which dots are sparse in the horizontal direction and in the vertical direction.

4. The image forming apparatus according to claim 1, wherein the patch image the output stability of which is high is determined based on output stability information set in advance for each patch image.

5. The image forming apparatus according to claim 1, wherein the patch image the sensitivity of which is high is determined based on sensitivity information set in advance for each patch image.

6. The image forming apparatus according to claim 1, wherein the at least one memory stores further instructions, which when executed by the one or more processors, cause the image forming apparatus to:

detect environmental fluctuations within a casing of the image forming apparatus, wherein the patch image the output stability of which is high is determined in accordance with environmental fluctuations detected.

7. The image forming apparatus according to claim 1, wherein the at least one memory stores further instructions, which when executed by the one or more processors, cause the image forming apparatus to:

form all patch images of a group of patch images configured by a pattern; and determine whether or not density information on a patch image formed is within a predetermined range, wherein use a patch image the density information of which determined is within the predetermined range for the first updating as the patch image the output stability of which is high and uses a patch image the density information of which determined is not within the predetermined range for the second updating as the patch image the sensitivity of which is high.

8. An updating method of gamma correction information performed by an image forming apparatus that corrects a density tone level of image data by using gamma correction information and forms an image based on corrected image data, the method comprising:

a first updating step of updating the gamma correction information by using a patch image the output stability of which is high for environmental fluctuations within a casing of the image forming apparatus;

a second updating step of further updating the gamma correction information updated in the first updating step by using a patch image the sensitivity of which is high for environmental fluctuations within a casing of the image forming apparatus after the first updating step; and causing the image forming apparatus to form the image.

9. A non-transitory computer readable storage medium storing a program for causing a computer to perform an updating method of gamma correction information performed by an image forming apparatus that corrects a density tone level of image data by using gamma correction information and forms an image based on corrected image data, the method comprising:

a first updating step of updating the gamma correction information by using a patch image the output stability of which is high for environmental fluctuations within a casing of the image forming apparatus;

a second updating step of further updating the gamma correction information updated in the first updating step by using a patch image the sensitivity of which is high for environmental fluctuations within a casing of the image forming apparatus after the first updating; and causing the image forming apparatus to form the image.

* * * * *